US009979239B2

(12) United States Patent
Plekhanov et al.

(10) Patent No.: US 9,979,239 B2
(45) Date of Patent: May 22, 2018

(54) SYSTEMS AND METHODS FOR WIRELESS POWER TRANSFERRING

(71) Applicant: Global Energy Transmission, Co., Moscow (RU)

(72) Inventors: Sergey Plekhanov, Moscow (RU); Leonid Plekhanov, Moscow (RU)

(73) Assignee: Global Energy Transmission, Co., Woodland, WA (US)

( * ) Notice: Subject to any disclaimer, the term of this patent is extended or adjusted under 35 U.S.C. 154(b) by 0 days. days.

(21) Appl. No.: 15/461,793

(22) Filed: Mar. 17, 2017

(65) Prior Publication Data

US 2017/0271925 A1 Sep. 21, 2017

Related U.S. Application Data

(60) Provisional application No. 62/310,557, filed on Mar. 18, 2016, provisional application No. 62/343,776, (Continued)

(51) Int. Cl.
*H02J 50/12* (2016.01)
*H02J 50/80* (2016.01)
(Continued)

(52) U.S. Cl.
CPC .............. *H02J 50/12* (2016.02); *H02J 7/025* (2013.01); *H02J 50/10* (2016.02); *H02J 50/40* (2016.02); *H02J 50/80* (2016.02)

(58) Field of Classification Search
CPC .................................. H02J 50/80; H02J 50/40
See application file for complete search history.

(56) References Cited

U.S. PATENT DOCUMENTS 9,231,412 B2 * 1/2016 Lisi ......................... H02J 5/005
2008/0266748 A1 * 10/2008 Lee ......................... H02J 5/005 361/270

(Continued)

OTHER PUBLICATIONS

PhysicsNet, "Electromotive Force and Internal Resistance," pp. 1-5, Apr. 6, 2013.*

(Continued)

*Primary Examiner* — Thienvu Tran
*Assistant Examiner* — Pinping Sun
(74) *Attorney, Agent, or Firm* — Kolisch Hartwell, P.C.

(57) ABSTRACT

A wireless power transfer system includes a transmitter transducer, a signal generator and one or more power receivers. The signal generator may receive a first power signal from a power source and generate an alternating current transmission signal. The signal generator transmits the transmission signal to the transmitter transducer. The transmitter transducer may produce a magnetic field in a power transfer region during conduction of a transmission signal. The one or more power receivers may include a receiver transducer and a power processor. The receiver transducer may inductively receive a varying magnetic flux transmitted from the transmitter transducer when the receiver transducer is located in the power transfer region. The receiver transducer converts the received magnetic flux to a second power signal. The power processor converts the second power signal to a third power signal appropriate for a respective one or more loads.

21 Claims, 6 Drawing Sheets

Related U.S. Application Data filed on May 31, 2016, provisional application No. 62/348,640, filed on Jun. 10, 2016.

(51) Int. Cl.

| | |
|---|---|
| ***H02J 50/40*** | (2016.01) |
| ***H02J 7/02*** | (2016.01) |
| ***H02J 50/10*** | (2016.01) |

(56) References Cited

U.S. PATENT DOCUMENTS

2009/0072628 A1* 3/2009 Cook .................... H01Q 1/248 307/104
2009/0243397 A1* 10/2009 Cook .................... H02J 5/005 307/104
2009/0302688 A1* 12/2009 Boys .................... H02J 5/005 307/104
2011/0080054 A1* 4/2011 Urano .................... H02J 5/005 307/104
2011/0254377 A1* 10/2011 Wildmer .............. B60L 11/182 307/104
2012/0248890 A1* 10/2012 Fukushima ............ H02J 5/005 307/104
2012/0286582 A1* 11/2012 Kim .................... H02J 5/005 307/104
2013/0009462 A1* 1/2013 Amano .................. B60L 5/005 307/9.1
2013/0076306 A1* 3/2013 Lee .................... H02J 7/025 320/108
2013/0181539 A1* 7/2013 Muratov ................ H01F 38/14 307/104
2013/0207468 A1* 8/2013 Wu .................. H02M 3/33576 307/31
2014/0062395 A1* 3/2014 Kwon .................... H02J 50/60 320/108
2014/0339923 A1* 11/2014 Simopoulos ............ H02J 5/005 307/149
2015/0108849 A1* 4/2015 Robertson .............. H02J 17/00 307/104
2016/0087458 A1* 3/2016 Grbic .................... H02J 5/005 307/104

OTHER PUBLICATIONS

Si, "a frequency control method for regulating wireless power to implantable devices," IEEE Transactions on biomedical circuits and systems, vol. 2, No. 1, Mar. 2008, pp. 22-29.*
Enpuku, K. et al., "Performance of Pickup Coil Made of Litz Wire and Coupled to HTS SQUID", Physics Procedia, vol. 36, (2012), pp. 400-404.
Gupta, Vikram et al., "Energy Harvesting from Electromagnetic Energy Radiating from AC Power Lines", article, 2010, 5 pages.
Sullivan, C. R., "Optimal Choice for Number of Strands in a Litz-Wire Transformer Winding", IEEE Transactions on Power Electronics, vol. 14, No. 2, Mar. 1999, pp. 283-291.

* cited by examiner

SYSTEMS AND METHODS FOR WIRELESS POWER TRANSFERRING

CROSS-REFERENCES TO RELATED APPLICATIONS

The present application claims the benefit under 35 U.S.C. § 119(e) of the following three patent applications, each of which are hereby incorporated by reference in their entirety for all purposes: U.S. Provisional Patent Application Ser. No. 62/310,557 for DISTANT WIRELESS POWER TECHNOLOGY, filed Mar. 18, 2016, U.S. Provisional Patent Application Ser. No. 62/343,776 for DISTANT WIRELESS POWER TECHNOLOGY, filed May 31, 2016, and U.S. Provisional Patent Application Ser. No. 62/348,640 for DISTANT WIRELESS POWER TECHNOLOGY, filed Jun. 10, 2016.

TECHNICAL FIELD

The disclosure relates to wireless power transferring. More particularly, the disclosure relates to methods and systems for wirelessly transferring power for use by power-consuming devices.

BACKGROUND

Portable electronic devices and electrical devices rely on battery power for uninterrupted operation. These portable electronic devices and electrical devices include smart phones, tablets, laptops, personal digital assistants, electric vehicles, cameras, robots, medical devices and the like. The frequency that the batteries of these devices need to be charged is constantly increasing due to increased functionalities of these devices and the corresponding increase in the load put on the battery. Such devices are typically charged by wired connection to a power source. Technology also exists for wirelessly charging electronic devices by placing the devices to be charged on or in close proximity to inductive charging pads. The inductive charging pads employ magnetic induction for inductively charging these devices.

SUMMARY

In a first example, a wireless power transfer system is provided. The wireless power transfer system may include a transmitter transducer, a signal generator and one or more power receivers. The transmitter transducer may produce a magnetic field in a power transfer region during conduction of a transmission signal. The signal generator may be configured to be electrically connected to the transmitter transducer. The signal generator may be configured to receive a first power signal from a power source. In addition, the signal generator may be configured to generate an alternating current transmission signal having a transmission frequency of at least 500 Hz from the first power signal. Moreover, the signal generator may be configured to transmit the transmission signal to the transmitter transducer at the transmission frequency.

The one or more power receivers may be configured to be electrically connected to respective one or more loads. Each of the one or more power receivers may include a receiver transducer and a power processor. The receiver transducer may be configured to be configured to inductively receive a time varying magnetic flux of the magnetic field transmitted from the transmitter transducer when the receiver transducer is disposed in the power transfer region. In addition, the receiver transducer may be configured to convert the time varying magnetic flux to a second power signal. The second power signal may be a time varying power signal. The second power signal may have the transmission frequency of the transmission signal. The power processor may be electrically connected to the receiver transducer. The power processor may be configured to convert the second power signal to a third power signal appropriate for the respective one or more loads.

In a second example, a method for wireless power transferring is provided. The method may include receiving a first power signal by a signal generator from a power source, generating an alternating current transmission signal having a transmission frequency of at least 500 Hz by the signal generator from the first power signal, producing a magnetic field in a power transfer region by the signal generator by transmitting the transmission signal to a transmitter transducer at the transmission frequency, inductively receiving a time varying magnetic flux of the magnetic field transmitted from the transmitter transducer when the receiver transducer is disposed in the power transfer region by a receiver transducer in one or more power receivers, converting the time varying magnetic flux by the receiver transducer to a second power signal having the transmission frequency of the transmission signal, and converting the second power signal to a third power signal appropriate for a respective one load by a power processor configured to be connected to the one load or more than one load including the one load.

In a third example, a wireless power transmitter may include a signal generator. The signal generator may receive a first power signal from a power source. In addition, the signal generator may generate an alternating current transmission signal having a transmission frequency of at least 500 Hz from the first power signal. Moreover, the signal generator may transmit the transmission signal to a transmitter transducer at the transmission frequency.

In a fourth example, a method for wireless power transfer is provided. The method may include receiving a first power signal by a signal generator from a power source, generating an alternating current transmission signal having a transmission frequency of at least 500 Hz from the first power signal by the signal generator, producing a magnetic field in a power transfer region by transmitting the transmission signal to a transmitter transducer at the transmission frequency by the signal generator for transferring power to a receiver having a receiver transducer disposed in the magnetic field.

In a fifth example, a wireless power receiver is provided. The wireless power receiver may be configured to be electrically connected to an electrical load. The wireless power receiver may include a receiver transducer and a power processor. The receiver transducer may be configured to inductively receive a time varying magnetic flux in a power transfer region of a magnetic field transmitted from a transmitter transducer when the receiver transducer is disposed in the power transfer region. In addition, the receiver transducer may be configured to convert the time varying magnetic flux to a time-varying first power signal having a transmission frequency of at least 500 Hz. The power processor may be configured to be electrically connected to the receiver transducer and may be configured to convert the first power signal to a second power signal appropriate for the load.

In a sixth example, a method for wireless power reception by a receiver configured to be electrically connected to an electrical load is provided. The method may include inductively receiving a time varying magnetic flux by a receiver transducer of one or more power receivers in a power transfer region of a magnetic field transmitted from a transmitter transducer when the receiver transducer is disposed in the power transfer region, converting the time varying magnetic flux to a time varying first power signal having a transmission frequency of at least 500 Hz by the receiver transducer, and converting the first power signal to a second power signal appropriate for the electrical load by a power processor.

BRIEF DESCRIPTION OF THE DRAWINGS

Figure 1:
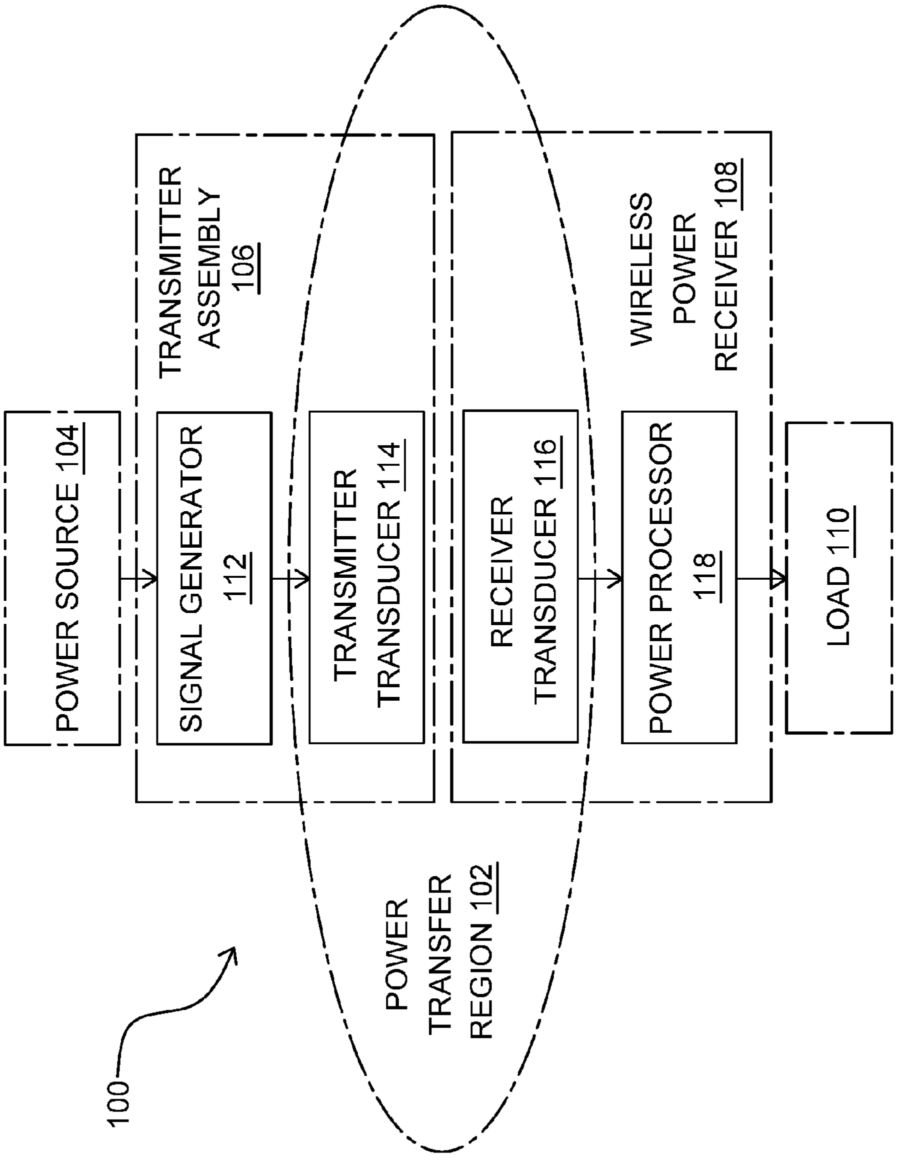
Figure 2:
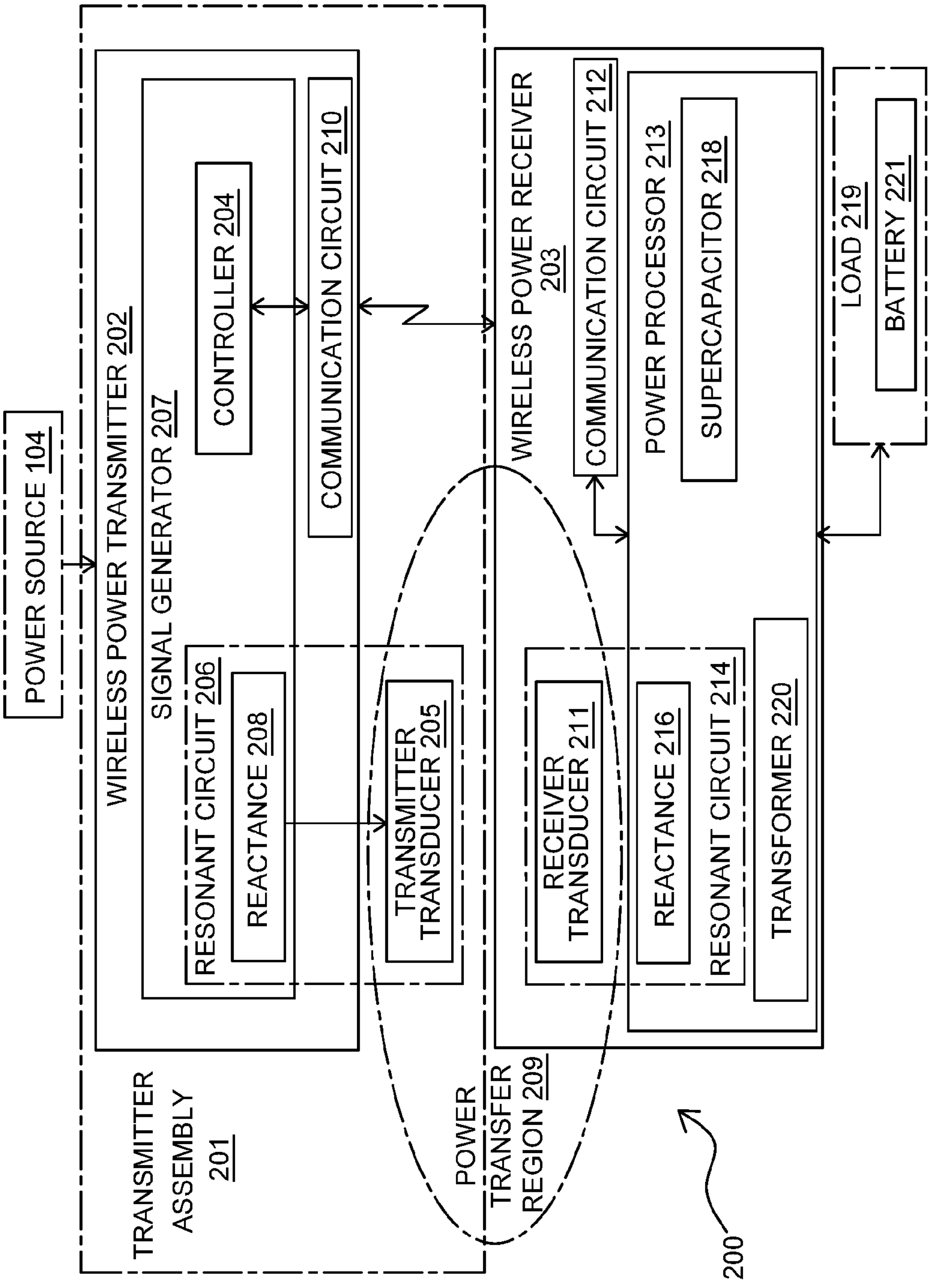
Figure 3:
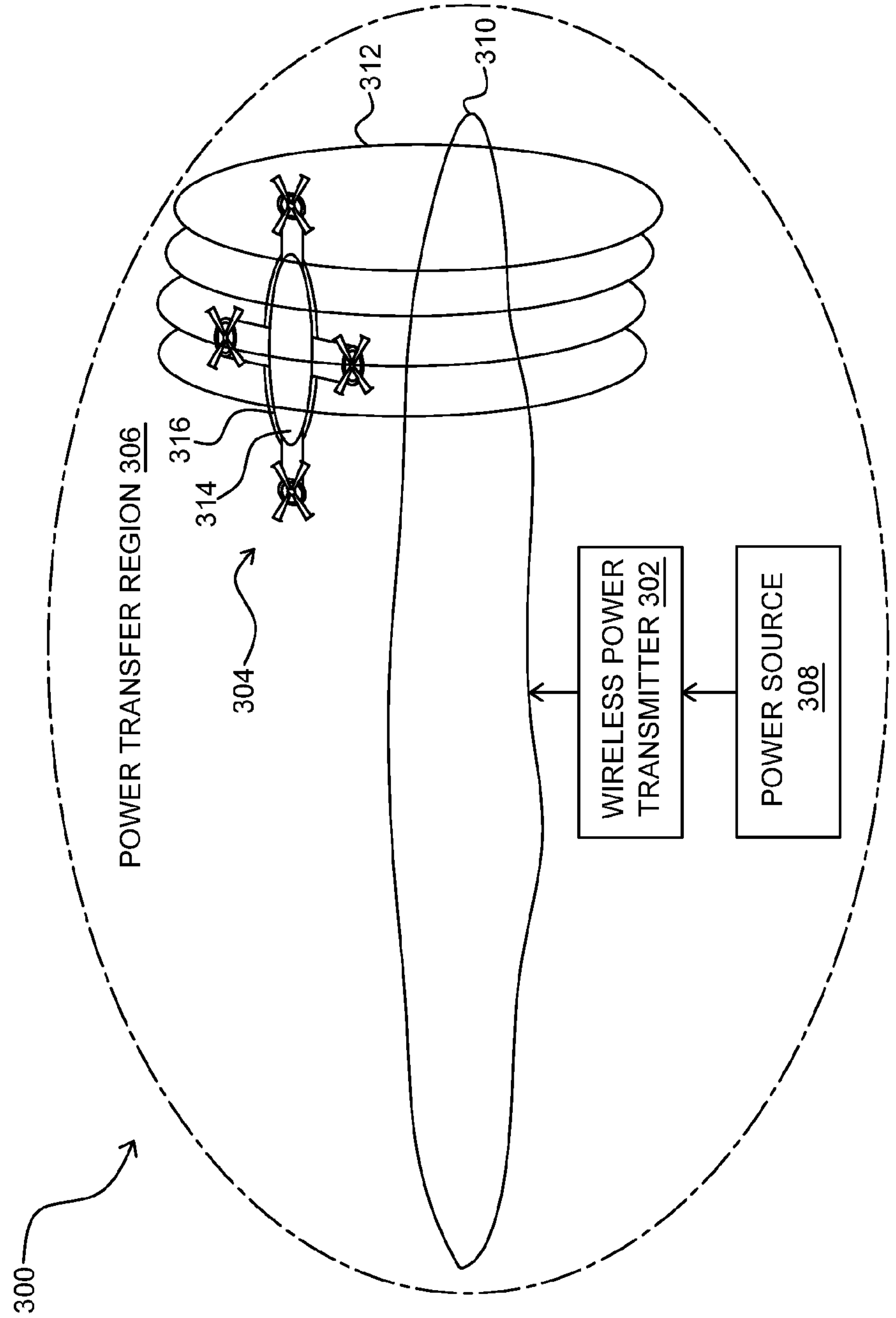
Figure 4:
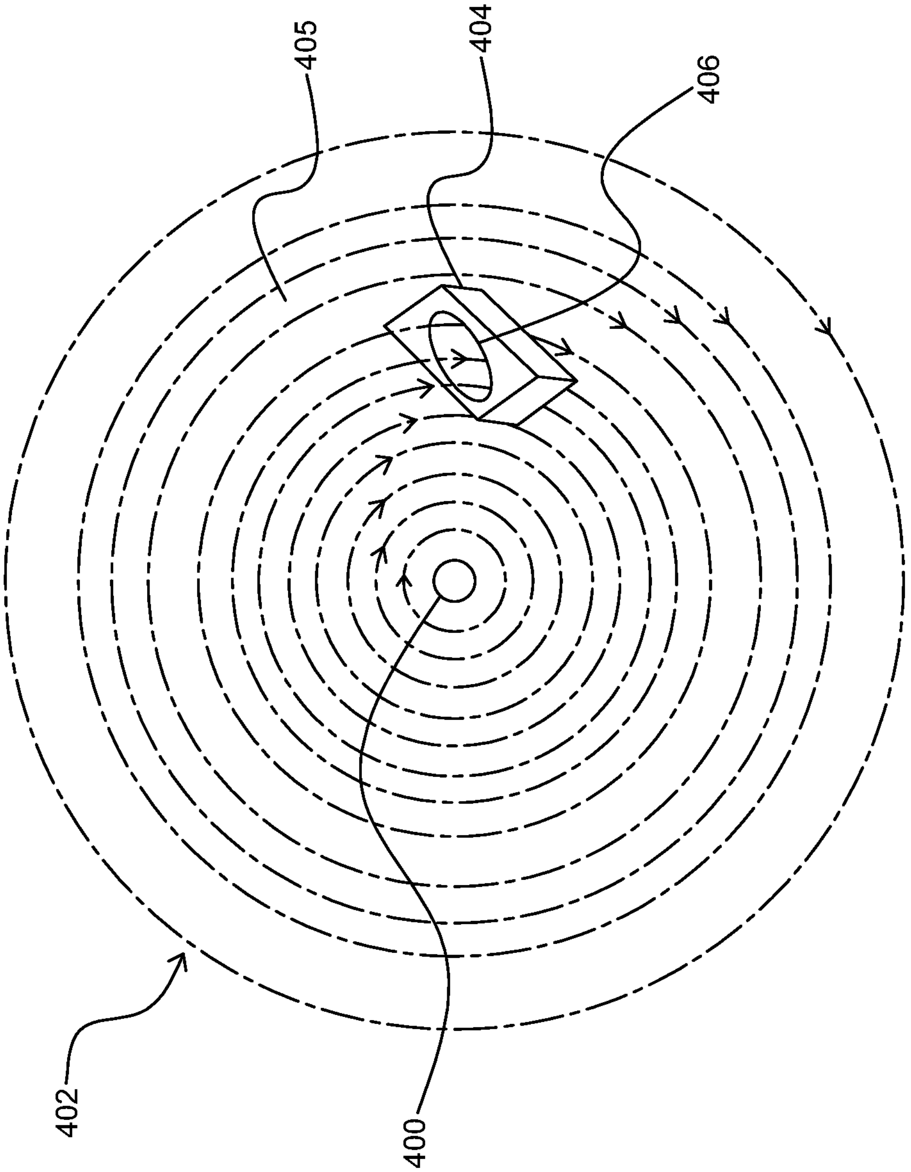
Figure 5:
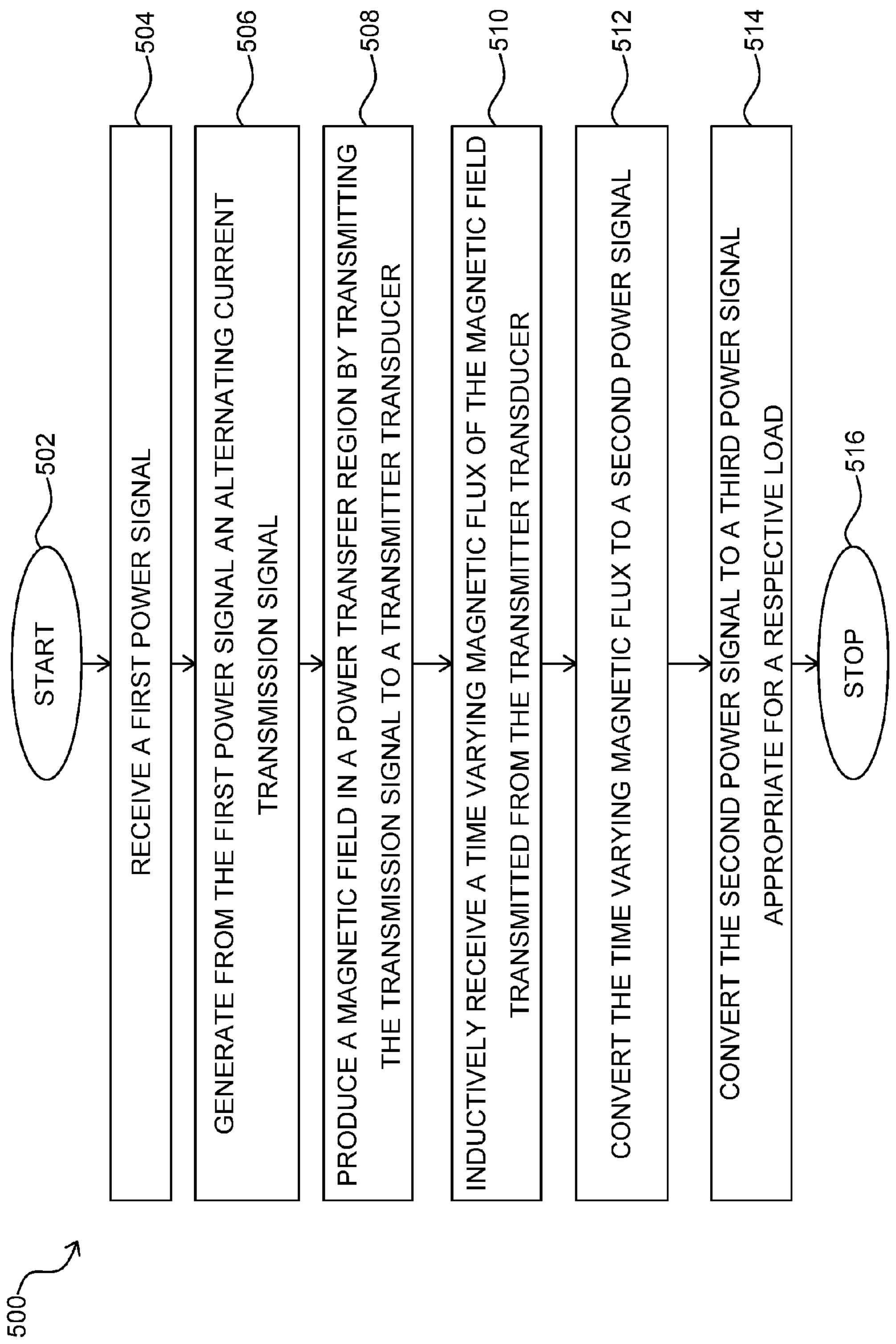
Figure 6:
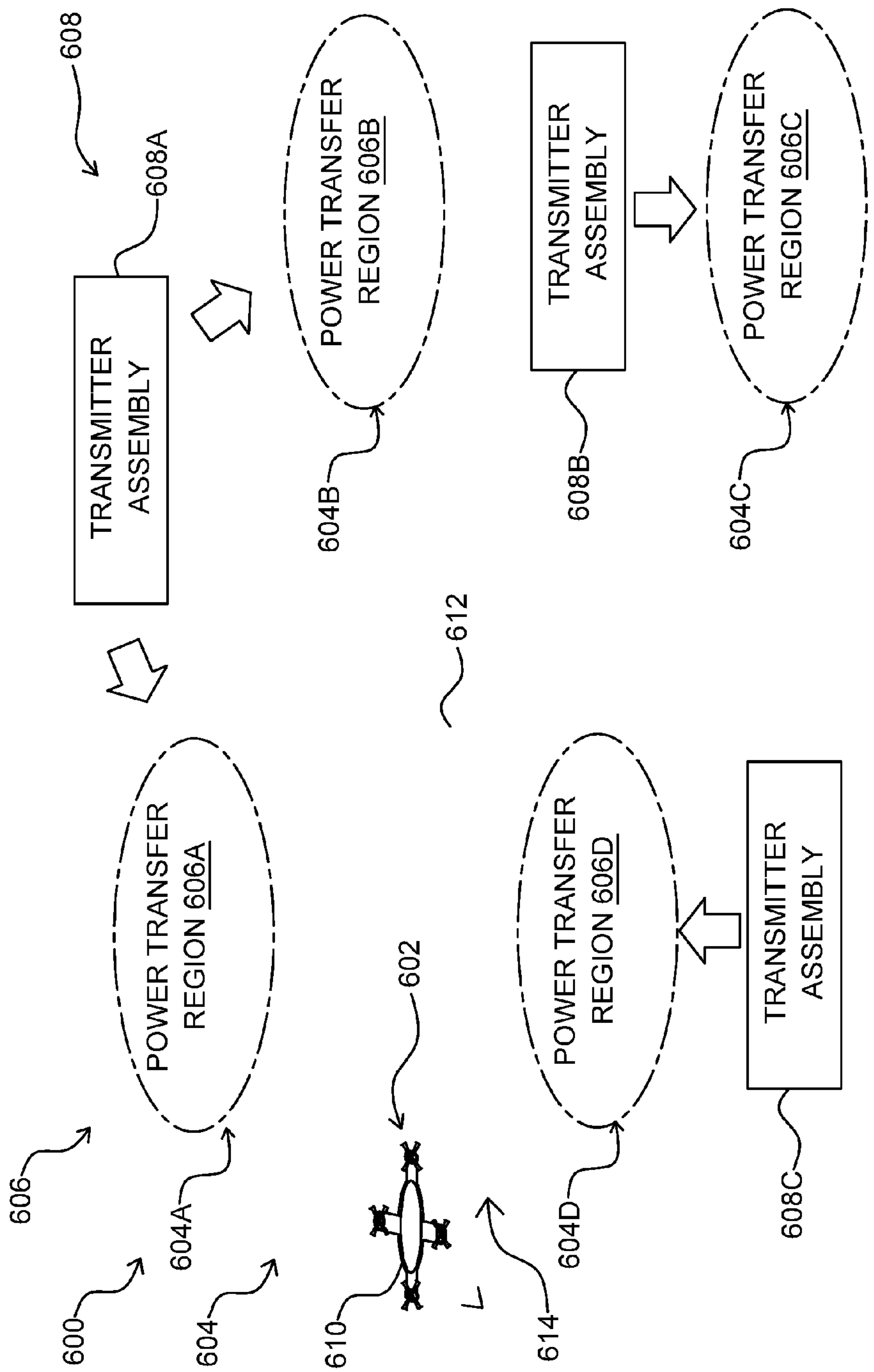

Having thus described the invention in general terms, reference will now be made to the accompanying drawings, which are not necessarily drawn to scale, and wherein:

FIG. 1 is a block diagram of an example of a wireless power transfer system for transferring wirelessly power to one or more devices;

FIG. 2 is a block diagram illustrating different components of an exemplary wireless power transfer system;

FIG. 3 is an illustration of an example of an application of wireless power transfer for powering an aerial vehicle in a power transfer region;

FIG. 4 shows a cross-section view of an example of a transmitter conductor conducting a transmission signal producing a magnetic field around the conductor for transferring power wirelessly to a receiver; and FIG. 5 illustrates a flowchart of an example of wireless power transferring; and FIG. 6 illustrates an example of distributed power transfer regions through which an aerial vehicle may travel.

There may be additional structures described in the description that are not depicted in the drawings, and the absence of such a depictions should not be considered as an omission of such design from the specification.

DETAILED DESCRIPTION

Before describing embodiments in detail, it should be observed that the embodiments may utilize system components and method steps related to wireless power transmission, reception, and transfer. Accordingly, the system components have been represented where appropriate by conventional symbols in the drawings, showing specific details that are pertinent for an understanding of the embodiments so as not to obscure the description with details that will be readily apparent to those with ordinary skill in the art having the benefit of the description herein.

Detailed embodiments are disclosed herein; however, it is to be understood that the disclosed embodiments are merely exemplary of the claimed inventions, which can be embodied in various forms. Therefore, specific structural and functional details disclosed herein are not to be interpreted as limiting, but merely as a basis for the claims and as a representative basis for teaching one skilled in the art to variously employ the disclosed concepts in an appropriate structure or method. Further, the terms and phrases used herein are not intended to be limiting but rather to provide an understandable description of the subject matter.

FIG. 1 illustrates a block diagram of an example of a wireless power transfer system 100 for wireless power transferring. The wireless power transfer system 100 enables transferring of electrical power to one or more devices in real time. The wireless power transfer system 100 can be implemented in a closed environment. In an example, the wireless power transfer system 100 can be implemented in offices, homes or any other type of indoor location. The indoor location may include a room, a corridor, a conference room or any other area inside a building.

The wireless power transfer system 100 also can be implemented in an open environment. For example, the wireless power transfer system 100 may be implemented outside a building. The area outside the building may include a covered area with an opening to the open environment proximate the covered area. In yet another example, the wireless power transfer system 100 may enable transferring power a distance of 10 meters or more inside the closed environment. The wireless power transfer system 100 may enable transferring power a distance of 20 meters or more in the open environment. These distances are based on expected power delivery capabilities of the systems rather than any characteristics of the open or closed environments.

The wireless power transfer system 100 may facilitate wireless power transferring to one user device or to a plurality of user devices simultaneously or serially. In an example, the wireless power transfer system 100 may provide power to an aerial vehicle, such as unmanned aerial vehicles (UAVs), including drones, in the open environment which require power of more than 500 watts. In some examples, drones can be powered a distance of 20 meters or more from a wireless power transmitter transducer 114. The wireless power transfer system 100 can concurrently or sequentially power multiple numbers of devices. The wireless power transfer system 100 may includes a transmitter assembly 106 configured to be connected to a power source 104, and a wireless power receiver 108 configured to be connected to a load 110. The transmitter assembly 106 includes a signal generator 112 and a transmitter transducer 114. The wireless power receiver 108 includes a receiver transducer 116 and a power processor 118. Further, in some examples, the transmitter assembly 106 includes a wireless power transmitter 202 (shown in FIG. 2) that includes signal generator 112.

In this example, the signal generator 112 transmits a transmission signal to transmitter transducer 114. Transmitter transducer 114 may be an antenna. For example, transmitter transducer may be a conductive coil or loop formed by an electrical conductor that conducts the transmission signal. In some examples, the conductor may extend in any appropriate configuration, with part or all of the conductor being unshielded and ungrounded for producing a magnetic field in power transfer region 102. The portion of the conductor producing the magnetic field may be in a configuration other than a continuous loop, and may produce one or more power transfer regions along its length. The conduction of the transmission signal along a length of the electrical conductor may form a power transfer region along the conductor length. The power transfer region may extend to a shielded conductor disposed a distance away from signal generator 112 as appropriate for a particular application.

When the wireless power receiver 108 is disposed in a power transfer region 102, the wireless power receiver 108 can draw power from the magnetic field. In addition, the magnetic field produced by the electrical conductor induces a voltage on terminals of receiver transducer 116.

The wireless power transfer system 100 facilitates wireless power transfer when the wireless power receiver 108 is positioned in the power transfer region 102. The power transfer region 102 is an area inside which the wireless power receiver 108 is able to draw power from the magnetic field produced by the transmitter transducer 114. Further, as mentioned, the wireless power receiver 108 may be electrically coupled with one or more loads of a corresponding one or more devices. The one or more devices can be one or more electrical devices, one or more electronic devices, electromechanical devices, like a UAV, and the like. Examples of these one or more devices include smart-phones, tablets, laptops, personal digital assistants, cameras, unmanned aerial vehicles, and the like. The one or more devices may be any device using a battery as its power supply such as a wearable computing device, a wearable medical device, a portable MP3 player and the like. The battery of each device acts as the load 110. The load 110 is electrically coupled with the wireless power receiver 108. In addition, the load 110 may be any device which uses electrical power to operate. In some examples, devices may operate directly from power received from wireless power transfer system 100, with or without also charging a battery.

The wireless power receiver 108 can include one or more components which enable reception of the transmission signal and delivery of the power to the load of each corresponding device. The wireless power transfer system 100 performs wireless powering of the one or more devices that may be placed at large distances from the transmitter assembly 106, as appropriate for particular applications. The one or more devices need not be in close proximity to the transmitter assembly 106 to wirelessly receive power. The wireless power transmitter 202 is inductively interlinked with the wireless power receiver 108 when the wireless power receiver 108 is disposed in the power transfer region 102. The inductive interlinking is based on an electromagnetic field coupling the wireless power transmitter 202 and the wireless power receiver 108. In an embodiment, the wireless power transmitter 202 may be electrically connected with one or more power receivers for purposes other than transfer of power. Each power receiver is configured to be electrically connected to a corresponding device. The wireless power receiver 108 is positioned or located in a vicinity of the transmitter assembly 106. The transmitter assembly performs wireless transmission of electrical power for load 110 when connected to receiver 108. When load 110 includes a rechargeable battery, the power transferred may be used to charge in real time the battery of the one or more user devices having receiver 108 or when connected to receiver 108.

Going further, the signal generator 112 is configured to be connected to the power source 104. The power source 104 supplies an electrical first power signal to the signal generator 112. For example, the power source 104 may be electrically connected to a receiving port of the signal generator 112. In an embodiment, the power source 104 is an AC power source having a predetermined voltage and a predetermined frequency. Examples of commercially available voltages and frequencies include 110 Volts at 50 Hertz, 110 Volts at 100 Hertz, 220 Volts at 50 Hertz, 110 Volts at 60 Hertz, 120 Volts at 60 Hertz, or 230 Volts 50 Hertz. The power source 104 may be a three phase power source.

For example, the signal generator 112 may simply be plugged into a standard 110 Volt or 220 Volt power source, if available. In another embodiment, the power source 104 is a DC power source. The DC power source supplies direct current to the signal generator 112. An AC or DC power source may be provided by a generator, a renewable energy source, such as a solar, wind, or hydro power source, or other available power source.

The signal generator 112 is configured to receive the first power signal from the power source 104. The signal generator 112 is an electronic device that generates an alternating current transmission signal from the first power signal. In some embodiments, the signal generator 112 is a power and frequency adjustable signal generator.

Moreover, the alternating current transmission signal has a transmission frequency of at least 500 Hz. Higher frequency transmission signals may facilitate the use of receiver structures having dimensions corresponding to devices receiving wireless power. In an embodiment, the signal generator 112 generates the transmission signal with a frequency in a range of 10 kHz-500 kHz. In another embodiment, the signal generator 112 generates the transmission signal with a frequency in a range of 5 kHz-1000 kHz. In yet another embodiment, the signal generator 112 generates the transmission signal with a frequency in a range of 500 kHz-100 MHz. The signal generator 112 may be disposed inside or outside the power transfer region 102. The signal generator 112 is configured to transmit the transmission signal to the transmitter transducer 114 at a transmission frequency.

The signal generator 112 is configured to be electrically connected to the transmitter transducer 114. In addition, the transmitter transducer 114 may extend to a position disposed an appropriate distance from the signal generator 112. The appropriate distance may be a pre-determined distance such that the signal generator 112 lies outside the power transfer region 102. In an embodiment, terminals of the transmitter transducer 114 are connected to corresponding ports of the signal generator 112.

In some embodiments, the transmitter transducer 114 is an elongate transmitter conductor that extends along the power transfer region 102. The transmitter conductor is an electrical conductor of a suitable length for the particular application. The transmitter may be a stranded or non-stranded conductor. A stranded conductor may be made of a plurality of individually insulated wires stranded together. The number of strands may vary from 2-50,000 strands, with the number and size of strands being selected as appropriate or suitable for each particular application. In an embodiment, the plurality of individually insulated wires is in a range of 2-1000 individual strands. The use of multiple insulated relatively thin wires may reduce ohmic losses due to skin effect.

In some embodiments, the transmitter transducer 114 is in the form of a primary inductance coil. In an embodiment, the transmitter transducer 114 is a loop of non-shielded electrical conductor. In another embodiment, the transmitter transducer 114 includes a plurality of concentric loops of electrical conductors. The plurality of concentric loops may include loops of different sizes. In an embodiment, each concentric loop of electrical conductor includes multiple individually insulated wires stranded together. In another embodiment, each concentric loop of electrical conductor includes a single conductor wire.

Going further, the transmitter transducer 114 has a length and position suitable to provide power in a desired or predetermined power transfer region 102. The power transfer region 102 occupies a volume of space determined by the configuration of the conductor loop. In an example, the conductor loop extends from 5 meters to 100 meters inside a building and in another example, extends several kilometers, such as 5 kilometers, in an open environment. The transmitter transducer 114 has a largest dimension, such as a length of transmission conductor, or a conductive loop having a distance between opposite loop sections. The transmitter transducer 114 is preferably flexible, although it may be made or one or more substantially rigid elements. In an example, the transmission conductor or loop can be placed inside a wall, along a ceiling, on or in a floor, or in or on any other suitable support structure. The transmission conductor can be supported in any suitable way in a building or in an open environment.

In an embodiment, the transmitter transducer 114 includes silver mica capacitors or any other type of capacitors. The silver mica capacitors may provide improved precision, stability and reliability, particularly at higher frequencies, compared to other types of capacitors. In addition, silver mica capacitors may help achieve lower resistive and inductive losses with a Q factor above 1000.

As described above, the transmitter transducer 114 may be an antenna in the form of a current carrying conductor that produces a magnetic field when transmission-signal current flows along a length of the conductor.

The magnetic field is characterized by a time varying magnetic flux that defines the power transfer region 102, which has a magnetic field strength that is sufficient for transferring power to the wireless power receiver 108. In addition, in embodiments in which the transmitter transducer is a conductive loop, the configuration of the loop determines the configuration of the power transfer region 102. As mentioned above, the power transfer region 102 can be defined as a space containing the magnetic field where wireless power transfer is realizable by means of the wireless power transmitter assembly 106 and the wireless power receiver 108. The wireless power transfer is realizable where the magnetic field has sufficient strength for the wireless power receiver 108 to obtain useable amounts of power.

In an embodiment, the wireless power receiver 108 is configured to be internally connected to the load 110, such as when receiver 108 and load 110 are part of a common device. In another embodiment, the wireless power receiver 108 is configured to be externally connected to the load 110. The load 110 may be an electrical load of a user device, such as a battery which needs to be charged and/or operating electrical circuits. The wireless power receiver 108 may thus be housed in a housing separate from the load device, or may be part of the load device. When separate, the wireless power receiver 108 may include a cover conforming to a cover of the device associated with the load 110.

The wireless power receiver 108 includes the receiver transducer 116. The receiver transducer 116 may be a receiver antenna, such as a secondary coil forming a secondary inductance loop. The coil may have a pre-determined length appropriate to produce a desired level of inductance. The receiver transducer 116 may have dimensions of comparable size or smaller than corresponding dimensions of the transmitter transducer 114. In addition, the length of the receiver transducer 116 in the form of a coil may be less than the length of the transmitter transducer 114 when in the form of a conductive loop or elongate transmission conductor. In an embodiment, the receiver transducer 116 has a largest dimension between 1 and 0.00001 times the largest dimension of the transmitter transducer 114. In another embodiment, the receiver transducer 116 has a largest dimension between 0.1 and 0.00001 times the largest dimension of the transmitter transducer 114, such as when the transmitter transducer extends in a region many times larger than receiver transducer 116.

As is discussed further with reference to FIG. 2, the transmitter transducer 114 and the receiver transducer 116 may be configured to operate in a resonance state at a resonant frequency. In addition, the transmitter transducer 114 and the receiver transducer 116 may be impedance matched. The impedance matching may allow improved transfer of power from the wireless power transmitter to the wireless power receiver 108.

In an embodiment, the wireless power transmitter assembly 106 is configured to continuously transmit a transmitter communication signal to detect the presence of a wireless power receiver 108 in power transfer region 102. In an embodiment, the wireless power receiver 108 may send a receiver communication signal to the wireless power transmitter 202 in response to receipt of the transmitter communication signal.

In addition or alternatively, the wireless power receiver 108 may detect the magnetic field produced by the transmitter transducer 114. In some embodiments, the signal generator 112 automatically initiates the generation of the transmission signal in response to detection of the presence of the one or more power receivers 108 in the power transfer region 102. In response to the detection of a wireless power receiver 108 in the magnetic field of the power transfer region 102, the signal generator 112 may supply increased power in the transmission signal appropriate to power a load 110 associated with the power receiver 108.

Accordingly, the receiver transducer 116 receives the time varying magnetic flux of the magnetic field transmitted from the transmitter transducer 114 when the receiver transducer 116 is disposed in the power transfer region 102. The receiver transducer 116 converts the time varying magnetic flux to a second power signal having the transmission frequency of the transmission signal, which frequency is at least 500 Hz.

The receiver transducer 116 is electrically connected with the power processor 118. In addition, the power processor 118 is configured to be electrically connected to the load 110.

The power processor 118 converts the second power signal to a third power signal appropriate for the respective one or more loads 110. More specifically, the power processor 118 converts a voltage level of the second power signal to a predetermined voltage level of the third power signal appropriate for the load. A transformer (as shown in FIG. 2) may be used to provide the requisite change in voltage level. In addition, the second power signal is converted by the wireless power receiver 108 to the third power signal based on or in response to detection of the magnetic field produced by the transmitter transducer 114.

The wireless power receiver 108 detects the presence of the magnetic field and the power processor 118 may be configured to automatically initiate the conversion of the second power signal to the third power signal. For example, the wireless power receiver may detect the presence of the magnetic field when the receiver transducer 116 produces a detectable amount or a threshold amount of electromotive force.

It may be noted that in FIG. 1, the wireless power transfer system 100 enables power transfer to a single device having a wireless power receiver 108 with the receiver transducer 116; however, those skilled in the art will appreciate that a transmitter assembly 106 may provide power concurrently to a plurality of wireless power receivers 108.

FIG. 2 illustrates different components of a further example of a wireless power transfer system, shown generally at 200. Wireless power transfer system 200 is an example of the wireless power transfer system 100. The wireless power transfer system 200 includes a transmitter assembly 201 and a wireless power receiver 203. The transmitter assembly 201 includes a wireless power transmitter 202 and a transmitter transducer 205. The transmitter transducer 205 may be an antenna, such as an electrical transmission conductor configured to produce the magnetic field during conduction of the transmission signal along a length of the conductor, as described above with reference to FIG. 1. The transmission conductor may be formed into an inductive loop or coil.

The wireless power transmitter 202 includes a signal generator 207 and a communication circuit 210. A part or some parts of the wireless power transmitter 202 may lie within a power transfer region 209, or no parts of the wireless power transmitter 202 may lie within the power transfer region.

The signal generator 207 is electrically connected to the transmitter transducer 205 and is configured to be connected to the power source 104. The power source 104 supplies the first power signal to the signal generator 207. The signal generator 207 utilizes the first power signal to generate the transmission signal. Accordingly, the signal generator 207 transmits the transmission signal to the transmitter transducer 205. The transmission signal is transmitted at the transmission frequency of at least 500 Hz (as explained above with reference to signal generator 112 shown in FIG. 1).

The signal generator 207 includes a controller 204. The controller 204 is operatively coupled to transmission signal generating circuits in the signal generator 207. The controller 204 controls one or more operations of the transmission signal generating circuits of the signal generator 207 during generation of the transmission signal. The controller 204 acts as an adaptive control unit configured to control one or more parameters of the transmission signal, such as the transmission frequency and/or power level.

The controller 204 may monitor the transmission frequency and the power level of the transmission signal transmitted by the signal generator 207. In an embodiment, the controller 204 controls and varies the transmission frequency and/or the power level of the transmission signal The wireless power receiver 203 includes a receiver transducer 211, a communication circuit 212, and a power processor 213. In an embodiment, the receiver transducer 211 receives power in power transfer region 209 at a power level dependent on the distance of the receiver transducer 211 from the transmitter transducer 205 and the strength of the magnetic field. More specifically, the power level produced by the receiver transducer 211 is inversely proportional to the second power of the distance of the receiver transducer 211 from the transmitter transducer 205. This is in contrast to wireless power transmitters having a small sized transmitter transducer relative to the receiver transducer, in which case the power level of the receiver transducer is inversely proportional to the sixth power of the distance of the receiver transducer from the transmitter transducer.

As mentioned, the controller 204 generates a control signal for varying one or more parameters of the transmission signal. The controller 204 may be electrically coupled with a communication circuit 210. Communication circuit 210 may receive receiver information from a communication circuit 212 included in wireless power receiver 203. The controller 204 may in turn receive receiver information from the communication circuit 210, and in response to the received receiver information, generate a control signal to adjust the one or more parameters of the transmission signal, such as the frequency or the voltage level.

The power processor 213 may be configured to communicate receiver information to the communication circuit 212 regarding power demand and/or frequency of power suitable for efficiently receiving power on receiver transducer 211. The information provided by the power processor 213 is receiver information that is communicated by receiver communication circuit 212 to transmitter communication circuit 210.

The signal generator 207 may be configured to produce the transmission signal in response to receiver information received from each wireless power receiver 203 in the power transfer region 209.

In some embodiments, the transmitter communication circuit 210 transmits transmitter information to receiver communication circuit 212 of the wireless power receiver 203. In an embodiment, the transmitter information may include an amount of power available for transferring to the one or more wireless power receivers 203, or the frequency of the transmission signal. Accordingly, the power processor 213 may be configured to control an operation of the power processor 213 in response to the received transmitter information.

In an embodiment, communication between transmitter communication circuit 210 and receiver communication circuit 212 may be by a communication technology appropriate for the distance between communication circuit 210 and a range of possible positions of receiver communication circuit 212 in power transfer region 209. Examples of potentially useful communication technologies include Bluetooth, Zigbee, wireless local area network (WLAN), Wi-Fi, or any other suitable communication technology for exchanging information over the required distance.

In an embodiment, the receiver information may include information related to an amount of charge present in or power level required by a load 219 connected to the wireless power receiver 203, and/or a frequency to which the power processor 213 is tuned for receiving power with receiver transducer 211. The controller 204 may utilize such receiver information to control the amount of power to be transmitted to the wireless power receiver 203 or the frequency of the transmission signal.

In an embodiment, the controller 204 may include a microcontroller or Application Specific Integrated Circuit for processing receiver information received from the wireless power receiver 203. In an embodiment, the power processor 213 may include a microcontroller for processing transmission information received from the wireless power transmitter 202.

The transmitter assembly 201 may be configured to include a resonant circuit 206. The resonant circuit 206 may include a combination of a reactance 208 and the transmitter transducer 205. Reactance 208 includes one or more of capacitors and may include one or more inductors. In this example, the reactance 208 is a part of the signal generator 207 and the transmitter transducer 205 is a part of the transmitter assembly 201. The resonant circuit 206 has a resonant frequency that is the transmission frequency of the transmission signal. The reactance 208 may be adjustable to vary the resonant frequency. For example, the capacitance of a capacitor or the inductance of an inductor of the reactance 208 may be adjustable to vary the resonant frequency.

In some embodiments, the wireless power receiver 203 also includes a resonant circuit 214. The resonant circuit 214 includes a reactance 216 in the power processor 213 and the receiver transducer 211. The reactance 216 may include a variable capacitor and/or a variable inductor. The reactance of the resonant circuit 214 may be adjusted, such as by adjusting an inductance tuning circuit or a variable capacitor of the resonant circuit 214. The reactance of the resonant circuit 214 may be controlled to vary the resonant frequency of resonant circuit 214 to match the transmission frequency based on transmission information received from communication circuit 210.

In some embodiments, the power processor 213 includes a supercapacitor 218. The supercapacitor 218 can store electric charge rapidly as it is received from the magnetic field in power transfer region 209. A charge stored on supercapacitor 218 can then be used to power a load 219 of a device connected to wireless power receiver 203 and/or to charge a battery 221 of load 219. Such charging or operating can occur after wireless power receiver 203 leaves power transfer region 209. In an example, the supercapacitor 218 can be part of a wireless power receiver 203 attached to a drone. The supercapacitor 218 can store electric energy received by the receiver transducer 116 of the wireless power receiver 108 when the drone flies through power transfer region 209. The supercapacitor 218 can then gradually charge a battery 221 of the drone, such as when the drone is traveling out of a power transfer region 209.

In yet another example, the transmitter conductor can be in form of a system of wires which can be supported in the air at some distance above the ground or on elevated structures to serve as an energy channel for operating devices, such as drones or other aerial vehicles. The transmitter conductor can be several kilometers long, forming a power line for the drones. The drones can fly along the power line and be charged without having to land on the ground or other surface. The energy channel can be used for powering drones used for heavy cargo lifting, such as lifting as much as 10-20 Kg. The system of wires may produce a tube-like power transfer region 209 surrounding and extending along the long conductor wire. With appropriate power applied to the transmission signal, wireless power receivers 203 may be able to receive power at a distance of 10-20 meters from the transmitter conductor. Drones may be able to operate or move within this extended power transfer region 209 for an indefinite period of time. The transmitter assembly 201 can provide a wireless high power energy source capable of delivering several kilowatts per drone.

In some embodiments, the power processor 213 includes a transformer 220. The transformer 220 is electrically connected between the receiver transducer 211 and the load 219. The transformer 220 may convert a voltage level of the second power signal to a pre-determined voltage level of the third power signal applied to the load 219. Other circuits or circuit components may also be used to convert the voltage level of the second power signal to the pre-determined voltage level of the third power signal.

In an embodiment, the wireless power receiver 203 is electrically connected directly to the load 219. The wireless power receiver 203 can be directly connected to the load 219 with or without a voltage transformer or a current transformer. In an embodiment, the wireless power receiver 203 routes excessive power received from the transmitter assembly 201 to the battery 221. The power stored in the battery 221 can be applied directly to the load 219 when the power level received from the transmitter assembly 201 is low. The battery 221 can thus be used as a power buffer.

FIG. 3 shows an example of a wireless power transfer system 300 including a wireless power transmitter 302 for powering a drone 304 flying in the power transfer region 306. The wireless power transmitter 302 receives the first power signal from a power source 308. The wireless power transmitter 302 is electrically connected to the power source 308 and a transmitter transducer 310. The transmitter transducer 310 is in the form of an inductive loop the position and size of which defines the power transfer region 306. The wireless power transmitter 302 generates and transmits a transmission signal to the transmitter transducer 310. The transmitter transducer 310 produces a varying magnetic field, represented by magnetic-field lines 312, of the power transfer region 306. The magnetic field is used to power the drone 304 when the drone 304 is disposed in the power transfer region 306. The drone 304 includes a wireless power receiver 314. The power receiver 314 includes a receiver transducer 316 in the form of a conductive coil. The magnetic field lines 312 pass through the conductive coil. The varying magnetic field induces a voltage across terminals of the conductive coil that corresponds to the second power signal. Accordingly, the second power signal in the coil is converted to a third power signal and supplied to a battery of the drone 302 or directly to motors and other power consuming elements of the drone 302.

FIG. 4 shows a cross-section view of a transmitter conductor 400 with a magnetic field 402 around the conductor and a wireless power receiver 404 receiving power from the magnetic field 402. Transmitter conductor 400 is an example of a transmitter transducer 114, 205, or 310. Wireless power receiver 404 is an example of a wireless power receiver 108, 203, or 314. The cross-section view shows a power transfer region 405 inside which the wireless power transfer takes place. The transmitter conductor 400 may be an electrical conductor electrically connected to a wireless power transmitter, such as the wireless power transmitter 202 or 302, or to a signal generator 112. The transmitter conductor 400 receives a transmission signal from the signal generator of the power transmitter and produces the varying magnetic field 402 around the transmitter conductor 400.

The receiver 404 is a wireless power receiver electrically connected to a load or battery of a device which consumes electrical power. In an example, the receiver 404 is connected to a battery of a smart phone. The receiver 404 includes a receiver coil 406. When the receiver 404 is disposed in the power transfer region 405, the magnetic field lines pass through the receiver coil 406, inducing a voltage across terminals of the receiver coil 406. The voltage corresponds to the second power signal. Accordingly, the second power signal in the coil is converted to the third power signal and supplied to a battery or other load of the device containing the receiver 404.

FIG. 5 illustrates an example of a method 500 for the wireless transfer of power to one or more devices. Method 500 may be performed by the wireless power transfer systems 100, 200, or 300.

The method 500 initiates at step 502. Referencing power transfer system 100, at step 504, the signal generator 112 receives the first power signal from the power source 104. At step 506, the signal generator 112 generates the alternating current transmission signal from the first power signal. The transmission signal has the transmission frequency of at least 500 Hz. The signal generator 112 transmits the transmission signal to the transmitter transducer 114. At step 508, the signal generator 112 produces the magnetic field in the power transfer region 102 by transmitting the transmission signal to the transmitter transducer 114. At step 510, the receiver transducer 116 of each corresponding one or more power receivers inductively receives the time varying magnetic flux of the magnetic field transmitted from the transmitter transducer 114. The time varying magnetic flux of the magnetic field is received when the receiver transducer 116 is disposed in the power transfer region 102. At step 512, the receiver transducer 116 converts the time varying magnetic flux to the second power signal. The second power signal has the transmission frequency of the transmission signal. At step 514, the power processor 118 converts the second power signal to the third power signal appropriate for a respective one of the one or more loads 110. The method 500 terminates at step 516.

FIG. 6 illustrates an example of a distributed power transfer system 600 through which an aerial vehicle, such as a drone 602, may travel. In this example, distributed power transfer system 600 includes a plurality of cells 604, such as cells 604A, 604B, 604C, and 604D. Each cell corresponds to a wireless power transfer system as described above, and includes one or more power transfer regions 606 produced by an associated transmitter assembly 608. For example, power transfer regions 606 of the respective cells include power transfer regions 606A, 606B, 606C, and 606D. A transmitter assembly 608 may produce one or more associated power transfer regions 606. In this example, a transmitter assembly 608A produces power transfer regions 606A and 606B. Transmitter assemblies 608B and 608C produce respective power transfer regions 606C and 606D. Drone 602, having a wireless power receiver 610, may fly from cell to cell, such as along a flight path 612. When the drone 602 is in each power transfer region 606, the drone stores enough power to fly to the next power transfer region. It is thus seen that the cells 604 form a wireless power network 614 across which drones can travel. The cells can be as far apart as the drones are able to fly on the power received at each cell.

The wireless power transfer system and its components as described above have many advantages over the existing art. In preferred configurations, the wireless power transfer systems allow wireless charging and powering of devices a distance of 10 meters or more from the transmitter assembly in a closed environment, and distances of 20 meters or more from the transmitter assembly in an open environment. Moreover, the wireless power transfer system may be configured to perform wireless charging and powering at high operating frequencies.

From the above description, it will be appreciated that many variations are possible in a wireless power transfer system. The following numbered paragraphs describe aspects and features of embodiments. Each of these paragraphs can be combined with one or more other paragraphs, and/or with disclosure from elsewhere in this application in any suitable manner. Some of the paragraphs below expressly refer to and further limit other paragraphs, providing without limitation examples of some of the suitable combinations.

1. A wireless power transfer system comprising:
 - a transmitter transducer configured to produce a magnetic field in a power transfer region during conduction of a transmission signal;
 - a signal generator electrically configured to be connected to the transmitter transducer, the signal generator being operationally configured to:
   - receive a first power signal from a power source;
   - generate from the first power signal an alternating current transmission signal having a transmission frequency of at least 500 Hz; and
   - transmit the transmission signal to the transmitter transducer at the transmission frequency; and
 - one or more power receivers, each of the one or more power receivers being configured to be electrically connected to respective one or more loads, wherein each of the one or more power receivers comprises:
   - a receiver transducer configured to inductively receive a time varying magnetic flux of the magnetic field transmitted from the transmitter transducer when the receiver transducer is disposed in the power transfer region, and convert the time varying magnetic flux to a second power signal, the second power signal being a time varying power signal having the transmission frequency of the transmission signal; and
   - a power processor electrically connected to the receiver transducer, and configured to convert the second power signal to a third power signal appropriate for the respective one or more loads.

2. The wireless power transfer system of paragraph 1, further comprising a controller operatively coupled to the signal generator and configured to generate a control signal for varying one or more parameters of the transmission signal.

3. The wireless power transfer system of paragraph 2, wherein one parameter of the one or more parameters comprises the transmission frequency of the transmission signal.

4. The wireless power transfer system of paragraph 2, wherein one parameter of the one or more parameters comprises a power level of the transmission signal.

5. The wireless power transfer system of paragraph 2, wherein the one or more parameters comprises the transmission frequency and a power level of the transmission signal.

6. The wireless power transfer system of paragraph 2, further comprising a first communication circuit coupled to the controller and wherein at least one receiver of the one or more power receivers includes a second communication circuit, the first communication circuit configured to communicate with the second communication circuit and communicate to the controller receiver information received from the second communication circuit, the controller configured to control operation of the signal generator in response to the received receiver information 7. The wireless power transfer system of paragraph 6, wherein the second communication circuit is configured to communicate to the power processor transmitter information received from the first communication circuit, and the power processor is configured to control an operation of the power processor in response to the received transmitter information.

8. The wireless power transfer system of paragraph 2, further comprising a first communication circuit coupled to the controller, and wherein at least one receiver of the one or more power receivers includes a second communication circuit, the second communication circuit configured to communicate with the first communication circuit and communicate to the power processor transmitter information received from the first communication circuit, wherein the power processor is configured to control an operation of the power processor in response to the received transmitter information.

9. The wireless power transfer system of paragraph 1, wherein the transmitter transducer is an elongate transmitter conductor extending along the power transfer region.

10. The wireless power transfer system of paragraph 9, wherein the transmitter transducer is made of a plurality of individually insulated wires.

11. The wireless power transfer system of paragraph 1, wherein the signal generator in combination with the transmitter transducer includes a resonant circuit, the resonant circuit including a variable reactance electrically connected to the transmitter transducer, and the resonant circuit is configured to resonate at the transmission frequency.

12. The wireless power transfer system of paragraph 1, wherein the power processor in combination with the receiver transducer includes a resonant circuit configured to resonate at a reception frequency, the resonant circuit including a variable reactance electrically connected to the receiver transducer, the variable reactance being controllable to make the reception frequency correspond to the transmission frequency.

13. The wireless power transfer system of paragraph 1, wherein the power processor includes a super-capacitor.

14. The wireless power transfer system of paragraph 1, wherein the signal generator is configured to detect a presence of the one or more power receivers in the power transfer region; and automatically initiate the generation of the transmission signal in response to detecting the presence of the one or more power receivers in the power transfer region.

15. The wireless power transfer system of paragraph 1, wherein the one or more power receivers is configured to detect a presence of the magnetic field produced by the transmitter transducer; and automatically initiate converting the second power signal to the third power signal in response to detecting the presence of the magnetic field.

16. The wireless power transfer system of paragraph 15, wherein the presence of the magnetic field is detected when the receiver transducer produces a threshold amount of electromotive force.

17. The wireless power transfer system of paragraph 1, wherein the transmitter transducer is a loop of a non-shielded electrical conductor.

18. The wireless power transfer system of paragraph 1, wherein the transmitter transducer comprises a plurality of concentric loops of electrical conductors, the plurality of concentric loops including loops of different sizes.

19. The wireless power transfer system of paragraph 1, where the load uses power having a pre-determined voltage level, and wherein the power processor is further configured to convert a voltage level of the second power signal to the third power signal with the pre-determined voltage level.

20. The wireless power transfer system of paragraph 19, wherein the power processor further comprises a transformer electrically connected between the receiver transducer and the load, the transformer being configured to convert the voltage level of the second power signal to the pre-determined voltage level.

21. The wireless power transfer system of paragraph 1, wherein the signal generator is configured to generate the transmission signal with a frequency in a range of 10 kHz-500 kHz.

22. The wireless power transfer system of paragraph 1, wherein the signal generator is configured to generate the transmission signal with a frequency in a range of 5 kHz-1000 kHz.

23. The wireless power transfer system of paragraph 1, wherein the signal generator is configured to generate the transmission signal with a frequency in a range of 500 kHz-100 MHz.

24. The wireless power transfer system of paragraph 1, wherein a largest dimension of the receiver transducer is between 1 and 0.00001 times a largest dimension of the transmitter transducer.

25. The wireless power transfer system of paragraph 24, wherein the largest dimension of the receiver transducer is between 0.1 and 0.00001 times the largest dimension of the transmitter transducer.

26. A method comprising:

receiving, by a signal generator, a first power signal from a power source;

generating from the first power signal, by the signal generator, an alternating current transmission signal having a transmission frequency of at least 500 Hz;

producing, by the signal generator, a magnetic field in a power transfer region by transmitting the transmission signal to a transmitter transducer at the transmission frequency;

inductively receiving, by a receiver transducer in one or more power receivers, a time varying magnetic flux of the magnetic field transmitted from the transmitter transducer when the receiver transducer is disposed in the power transfer region;

converting, by the receiver transducer, the time varying magnetic flux to a second power signal having the transmission frequency of the transmission signal; and converting, by a power processor configured to be connected to one or more loads, the second power signal to a third power signal appropriate for a respective one load of the one or more loads.

27. The method of paragraph 26, varying, by a controller of the signal generator, one or more parameters of the transmission signal in response to a control signal.

28. The method of paragraph 27, wherein one parameter of the one or more parameters comprises the transmission frequency of the transmission signal.

29. The method of paragraph 27, wherein one parameter of the one or more parameters comprises a power level of the transmission signal.

30. The method of paragraph 27, wherein the one or more parameters comprises the transmission frequency and a power level of the transmission signal.

31. The method of paragraph 27, further comprising communicating, by a first communication circuit coupled to the controller of the signal generator, with a second communication circuit of one of the one or more power receivers; communicating, by the first communication circuit to the controller receiver information received from the second communication circuit, and controlling, by the controller, operation of the signal generator in response to the received receiver information.

32. The method of paragraph 31, further comprising communicating, by the second communication circuit to the power processor, transmitter information received from the first communication circuit, and controlling, by the power processor, an operation of the power processor in response to the received transmitter information.

33. The method of paragraph 27, further comprising communicating, by a second communication circuit of at least one receiver of the one or more power receivers to a first communication circuit coupled to the controller, transmitter information received from the first communication circuit to the power processor, and control, by the power processor, an operation of the power processor in response to received transmitter information.

34. The method of paragraph 26, wherein the transmitter transducer is an elongate transmitter conductor extending along the power transfer region.

35. The method of paragraph 26, further comprising detecting, by the signal generator, a presence of the one or more power receivers in the power transfer region; and automatically initiating the generation of the transmission signal in response to detecting the presence of the one or more power receivers in the power transfer region.

36. The method of paragraph 26, further comprising detecting, by the one or more power receivers, a presence of the magnetic field produced by the transmitter transducer; and automatically initiating conversion of the second power signal to the third power signal in response to detecting the presence of the magnetic field.

37. The method of paragraph 36, wherein the detecting of the presence of the magnetic field includes detecting when the receiver transducer produces a threshold amount of electromotive force.

38. The method of paragraph 26, where the load uses power having a pre-determined voltage, and wherein the converting of the second power signal to the third power signal includes converting a voltage level of the second power signal to the third power signal with the pre-determined voltage level.

39. The method of paragraph 38, wherein the converting of the voltage level of the second power signal to the third power signal with the pre-determined voltage level includes transforming, by a transformer, the voltage level of the second power signal to the pre-determined voltage level.

40. The method of paragraph 26, wherein the generating includes generating the transmission signal with a frequency in a range of 5 kHz-1000 kHz.

41. A wireless power transmitter comprising:

a signal generator; wherein the signal generator is configured to:

receive a power signal from a power source;

generate an alternating current transmission signal from the power signal, the transmission signal is characterized by a transmission frequency of at least 500 Hz; and transmit the transmission signal to a transmitter transducer configured to produce a magnetic field in a power transfer region during conduction of the transmission signal.

42. A wireless power assembly including the wireless power transmitter of paragraph 41 and the transmitter transducer.

43. The wireless power transmitter of paragraph 41, further comprising a controller operatively coupled to the signal generator and configured to generate a control signal for varying one or more parameters of the transmission signal.

44. The wireless power transmitter of paragraph 43, wherein one parameter of the one or more parameters comprises the transmission frequency of the transmission signal.

45. The wireless power transmitter of paragraph 43, wherein one parameter of the one or more parameters comprises a power level of the transmission signal.

46. The wireless power transmitter of paragraph 43, wherein the one or more parameters comprises the transmission frequency and a power level of the transmission signal.

47. The wireless power transmitter of paragraph 43, further comprising a first communication circuit coupled to the controller, the first communication circuit configured to communicate with a second communication circuit of one or more power receivers disposed in the power transfer region for receiving power from the wireless power transmitter, and communicate to the controller receiver information received from the second communication circuit, the controller configured to control operation of the signal generator in response to the received receiver information.

48. The wireless power transmitter of paragraph 47, wherein the controller is configured to send to the first communication circuit, transmitter information relating to one or more parameters of the transmission signal, and the first communication circuit is configured to communicate to the second communication circuit the transmitter information.

49. The wireless power transmitter of paragraph 41, wherein the signal generator in combination with the transmitter transducer includes a resonant circuit, the resonant circuit including a variable reactance electrically connected to the transmitter transducer, and the resonant circuit is configured to resonate at the transmission frequency.

50. The wireless power transmitter of paragraph 41, wherein the signal generator is configured to:

detect the presence of one or more power receivers in the power transfer region; and automatically initiate the generation of the transmission signal.

51. The wireless power transmitter of paragraph 41, wherein the transmitter transducer is a loop of a non-shielded electrical conductor.

52. The wireless power transmitter of paragraph 41, wherein the transmitter transducer comprises a plurality of concentric loops of electrical conductors, the plurality of concentric loops including loops of different sizes.

53. The wireless power transmitter of paragraph 41, wherein the transmitter transducer is an elongate transmitter conductor extending along the power transfer region.

54. The wireless power transmitter of paragraph 53, wherein the transmitter conductor is made of a plurality of individually insulated wires.

55. The wireless power transmitter of paragraph 41, wherein the signal generator is configured to generate the transmission signal with a frequency in a range of 10 kHz-500 kHz.

56. The wireless power transmitter of paragraph 41, wherein the signal generator is configured to generate the transmission signal with a frequency in a range of 5 kHz-1000 kHz.

57. The wireless power transmitter of paragraph 41, wherein the signal generator is configured to generate the transmission signal with a frequency in a range of 500 kHz-100 MHz.

58. A method for wireless power transmission comprising:

receiving, by a signal generator, a first power signal from a power source;

generating from the first power signal, by the signal generator, an alternating current transmission signal having a transmission frequency of at least 500 Hz;

producing, by the signal generator, a magnetic field in a power transfer region by transmitting the transmission signal to a transmitter transducer at the transmission frequency for transferring power to a receiver having a receiver transducer disposed in the magnetic field.

59. The method of paragraph 58, varying, by a controller of the signal generator, one or more parameters of the transmission signal in response to a control signal.

60. The method of paragraph 59, wherein one parameter of the one or more parameters comprises the transmission frequency of the transmission signal.

61. The method of paragraph 59, wherein one parameter of the one or more parameters comprises a power level of the transmission signal.

62. The method of paragraph 59, wherein the one or more parameters comprises the transmission frequency and a power level of the transmission signal.

63. The method of paragraph 59, further comprising communicating, by a first communication circuit coupled to a controller of the signal generator, with a second communication circuit of the receiver and communicating by the first communication circuit to the controller receiver information received from the second communication circuit, and controlling, by the controller, operation of the signal generator in response to the received receiver information.

64. The method of paragraph 63, further comprising sending by the controller to the first communication circuit, transmitter information relating to one or more parameters of the transmission signal, and communicating, by the first communication circuit to the second communication circuit, the transmitter information.

65. The method of paragraph 58, wherein the transmitter transducer is an elongate transmitter conductor extending along the power transfer region.

66. The method of paragraph 58, further comprising detecting, by the signal generator, a presence of the receiver in the power transfer region; and automatically initiating the generation of the transmission signal in response to detecting the presence of one or more power receivers in the power transfer region.

67. The method of paragraph 58, wherein the generating includes generating the transmission signal with a frequency in a range of 5 kHz-1000 kHz.

68. A wireless power receiver configured to be electrically connected to an electrical load, the wireless power receiver comprising:

a receiver transducer configured to inductively receive a time varying magnetic flux in a power transfer region of a magnetic field transmitted from a transmitter transducer when the receiver transducer is disposed in the power transfer region, and convert the time varying magnetic flux to a time-varying first power signal having a transmission frequency of at least 500 Hz; and a power processor electrically connected to the receiver transducer, and configured to convert the first power signal to a second power signal appropriate for the electrical load.

69. The wireless power receiver of paragraph 68, further comprising a first communication circuit electrically connected to the wireless power receiver, the first communication circuit configured to communicate with a second communication circuit of a signal generator transmitting a transmission signal having the transmission frequency to the transmitter transducer, and communicate to the power processor transmitter information received from the second communication circuit, and wherein the power processor is configured to control an operation of the power processor in response to the received transmitter information.

70. The wireless power receiver of paragraph 68, wherein the power processor in combination with the receiver transducer includes a resonant circuit configured to resonate at a reception frequency, the resonant circuit including a variable reactance electrically connected to the receiver transducer, and, the variable reactance being controllable to make the reception frequency correspond to the transmission frequency.

71. The wireless power receiver of paragraph 68, wherein the power processor includes a super-capacitor.

72. The wireless power receiver of paragraph 68, wherein the power receiver is configured to detect a presence of the magnetic field produced by the transmitter transducer; and automatically initiate conversion of the first power signal to the second power signal in response to detecting the presence of the magnetic field.

73. The wireless power receiver of paragraph 72, wherein the presence of the magnetic field is detected when the receiver transducer produces a threshold amount of electromotive force.

74. The wireless power transmission system of paragraph 68, where the electrical load uses power having a predetermined voltage level, and wherein the power processor is further configured to convert a voltage level of the first power signal to the second power signal with the predetermined voltage level.

75. The wireless power receiver of paragraph 74, wherein the power processor further comprises a transformer electrically connected between the receiver transducer and the load, the transformer being configured to convert the voltage level of the first power signal to the pre-determined voltage level.

76. A method for wireless power reception by a receiver configured to be electrically connected to an electrical load, the method comprising:

inductively receiving, by a receiver transducer of one or more power receivers, a time varying magnetic flux in a power transfer region of a magnetic field transmitted from a transmitter transducer when the receiver transducer is disposed in the power transfer region;

converting, by the receiver transducer, the time varying magnetic flux to a time varying first power signal having a transmission frequency of at least 500 Hz; and converting, by a power processor, the first power signal to a second power signal appropriate for the electrical load.

77. The method of paragraph 76, further comprising receiving, by a first communication circuit of the receiver transmitter information from a second communication circuit of a signal generator transmitting a transmission signal having the transmission frequency to the transmitter transducer, and sending, by the first communication circuit to the power processor, the received transmitter information, and controlling by the power processor an operation of the power processor in response to the transmitter information.

78. The method of paragraph 76, further comprising detecting, by the power receiver, presence of the magnetic field produced by the transmitter transducer; and automatically initiating conversion of the first power signal to the second power signal in response to detecting the presence of the one or more power receivers in the power transfer region.

79. The method of paragraph 78, wherein the detecting the presence of the magnetic field includes detecting when the receiver transducer produces a threshold amount of electromotive force.

80. The method of paragraph 76, where the electrical load uses power having a pre-determined voltage, and wherein converting the first power signal to the second power signal includes converting a voltage level of the first power signal to the second power signal with the pre-determined voltage level.

81. The method of paragraph 80, wherein the converting of the voltage level of the first power signal to the second power signal with the pre-determined voltage level includes transforming, by a transformer, the voltage level of the first power signal to the pre-determined voltage level.

It is believed that the disclosure set forth herein encompasses multiple distinct inventions with independent utility. While each of these inventions has been disclosed in its preferred form, the specific embodiments thereof as disclosed and illustrated herein are not to be considered in a limiting sense as numerous variations are possible. Each example defines an embodiment disclosed in the foregoing disclosure, but any one example does not necessarily encompass all features or combinations that may be eventually claimed. Where the description recites “a” or “a first” element or the equivalent thereof, such description includes one or more such elements, neither requiring nor excluding two or more such elements. Further, ordinal indicators, such as first, second, or third, for identified elements are used to distinguish between the elements, and do not indicate a required or limited number of such elements, and do not indicate a particular position or order of such elements unless otherwise specifically stated.

What is claimed is:

1. A wireless power transfer system comprising: a transmitter transducer configured to produce a magnetic field in a power transfer region during conduction of a transmission signal;

a signal generator electrically configured to be connected to the transmitter transducer, the signal generator being operationally configured to:

receive a first power signal from a power source;

generate from the first power signal an alternating current transmission signal having a transmission frequency of at least 500 Hz; and transmit the transmission signal to the transmitter transducer at the transmission frequency;

the signal generator including a controller;

a first communication circuit coupled to the controller; and one or more power receivers, each of the one or more power receivers being configured to be electrically connected to respective one or more loads, wherein each of the one or more power receivers comprises:

a receiver transducer configured to inductively receive a time varying magnetic flux of the magnetic field transmitted from the transmitter transducer when the receiver transducer is disposed in the power transfer region, and convert the time varying magnetic flux to a second power signal, the second power signal being a time varying power signal having the transmission frequency of the transmission signal;

a power processor electrically connected to the receiver transducer, and configured to convert the second power signal to a third power signal appropriate for the respective one or more loads and to produce receiver information about a function of the receiver; and a second communication circuit operatively coupled to the power processor for receiving the receiver information, the second communication circuit configured to communicate the receiver information to the first communication circuit, and the first communication circuit configured to communicate to the controller the receiver information received from the second communication circuit, the controller configured to generate a control signal in response to the received receiver information, and the signal generator being responsive to the control signal for adjusting a parameter of the transmission signal, wherein the one or more power receivers is configured to detect a presence of the magnetic field produced by the transmitter transducer; and automatically initiate converting the second power signal to the third power signal in response to detecting the presence of the magnetic field, and the presence of the magnetic field is detected when the receiver transducer produces a threshold amount of electromotive force.

2. The wireless power transfer system of claim 1, wherein one parameter of the one or more parameters comprises the transmission frequency of the transmission signal.

3. The wireless power transfer system of claim 1, wherein one parameter of the one or more parameters comprises a power level of the transmission signal.

4. The wireless power transfer system of claim 1, wherein the one or more parameters comprises the transmission frequency and a power level of the transmission signal.

5. The wireless power transfer system of claim 1, wherein the transmitter transducer is an elongate transmitter conductor extending along the power transfer region.

6. The wireless power transfer system of claim 5, wherein the transmitter transducer is made of a plurality of individually insulated wires.

7. The wireless power transfer system of claim 1, wherein the signal generator in combination with the transmitter transducer includes a resonant circuit, the resonant circuit including a variable reactance electrically connected to the transmitter transducer, and the resonant circuit is configured to resonate at the transmission frequency.

8. The wireless power transfer system of claim 1, wherein the power processor in combination with the receiver transducer includes a resonant circuit configured to resonate at a reception frequency, the resonant circuit including a variable reactance electrically connected to the receiver transducer, the variable reactance being controllable to make the reception frequency correspond to the transmission frequency.

9. The wireless power transfer system of claim 1, wherein the power processor includes a super-capacitor.

10. The wireless power transfer system of claim 1, wherein the signal generator is configured to detect a presence of the one or more power receivers in the power transfer region; and automatically initiate the generation of the transmission signal in response to detecting the presence of the one or more power receivers in the power transfer region.

11. The wireless power transfer system of claim 1, wherein the transmitter transducer is a loop of a non-shielded electrical conductor.

12. The wireless power transfer system of claim 1, wherein the transmitter transducer comprises a plurality of concentric loops of electrical conductors, the plurality of concentric loops including loops of different sizes.

13. The wireless power transfer system of claim 1, where the load uses power having a pre-determined voltage level, and wherein the power processor is further configured to convert a voltage level of the second power signal to the third power signal with the pre-determined voltage level.

14. The wireless power transfer system of claim 13, wherein the power processor further comprises a transformer electrically connected between the receiver transducer and the load, the transformer being configured to convert the voltage level of the second power signal to the pre-determined voltage level.

15. The wireless power transfer system of claim 1, wherein the signal generator is configured to generate the transmission signal with a frequency in a range of 10 kHz 500 kHz.

16. The wireless power transfer system of claim 1, wherein the signal generator is configured to generate the transmission signal with a frequency in a range of 5 kHz 1000 kHz.

17. The wireless power transfer system of claim 1, wherein the signal generator is configured to generate the transmission signal with a frequency in a range of 500 kHz-100 MHz.

18. The wireless power transfer system of claim 1, wherein a largest dimension of the receiver transducer is between 1 and 0.00001 times a largest dimension of the transmitter transducer.

19. The wireless power transfer system of claim 18, wherein the largest dimension of the receiver transducer is between 0.1 and 0.00001 times the largest dimension of the transmitter transducer.

20. The wireless power transfer system of claim 1, wherein:

the signal generator is configured to produce transmitter information about a function of the signal generator;

the first communication circuit is configured to receive the transmitter information from the signal generator and communicate the transmitter information to the second communication circuit, the second communication circuit is configured to communicate the received transmitter information to the power processor, and the power processor is configured to adjust a parameter of the second power signal in response to the received transmitter information.

21. A wireless power transfer system comprising: a transmitter transducer configured to produce a magnetic field in a power transfer region during conduction of a transmission signal;

a signal generator electrically configured to be connected to the transmitter transducer, the signal generator being operationally configured to: receive a first power signal from a power source;

generate from the first power signal an alternating current transmission signal having a transmission frequency of at least 500 Hz; and transmit the transmission signal to the transmitter transducer at the transmission frequency;

the signal generator configured to produce transmitter information about a function of the signal generator;

a first communication circuit coupled to the signal generator and configured to receive the transmitter information from the signal generator; and one or more power receivers, each of the one or more power receivers being configured to be electrically connected to respective one or more loads, wherein each of the one or more power receivers comprises:

a receiver transducer configured to inductively receive a time varying magnetic flux of the magnetic field transmitted from the transmitter transducer when the receiver transducer is disposed in the power transfer region, and convert the time varying magnetic flux to a second power signal, the second power signal being a time varying power signal having the transmission frequency of the transmission signal;

a power processor electrically connected to the receiver transducer, and configured to convert the second power signal to a third power signal appropriate for the respective one or more loads, to receive transmitter information, and to control an operation of the power processor in response to the received transmitter information; and a second communication circuit operatively coupled to the power processor; wherein the first communication circuit is configured to communicate the transmitter information to the second communication circuit, the second communication circuit is configured to communicate the received transmitter information to the power processor, and the power processor is configured to adjust a parameter of the second power signal in response to the received transmitter information, wherein the one or more power receivers is configured to detect a presence of the magnetic field produced by the transmitter transducer; and automatically initiate converting the second power signal to the third power signal in response to detecting the presence of the magnetic field, and the presence of the magnetic field is detected when the receiver transducer produces a threshold amount of electromotive force.

* * * * *